United States Patent [19]

Renold

[11] Patent Number: 4,592,632
[45] Date of Patent: Jun. 3, 1986

[54] MOTION PICTURE SHUTTER METHOD AND APPARATUS

[76] Inventor: Walter Renold, 7044 Mary Ellen Ave., North Hollywood, Calif. 91605

[21] Appl. No.: 687,027

[22] Filed: Dec. 28, 1984

[51] Int. Cl.$^4$ .............................. G03B 9/10
[52] U.S. Cl. ........................ 352/214; 352/216
[58] Field of Search ............ 352/214, 215, 216, 219

[56] References Cited

U.S. PATENT DOCUMENTS

| | | | |
|---|---|---|---|
| 744,251 | 11/1903 | Smith | 352/214 |
| 1,836,224 | 12/1931 | Burkhardt | 352/215 |

FOREIGN PATENT DOCUMENTS

Ad.17483 of 1912 United Kingdom ............... 352/214

Primary Examiner—Monroe H. Hayes
Attorney, Agent, or Firm—Pastoriza, Kelly & Lowry

[57] ABSTRACT

For a given shutter size, the effective illumination or light transmission period is increased by one half that of the angles subtended by the aperture. This increase is accomplished by providing, in addition to a first shutter having an opaque section in the case of a camera of at least 180°, a second shutter having an opaque section of an angle equal to that subtended by the aperture. The second shutter is coaxially mounted with the first shutter and caused to rotate at twice the speed of the first shutter. By initially aligning the leading edges of the shutters with the start of the aperture, the aperture is effectively covered and uncovered in half the time which would normally be required by using a single shutter providing the same film transport period alone. As a consequence, the period of illumination is increased by the referred to one-half of the angle subtended by the aperture. This value becomes significant if the shutter diameter is small relative to the aperture size since the subtended angle becomes larger.

12 Claims, 3 Drawing Figures

MOTION PICTURE SHUTTER METHOD AND APPARATUS

FIELD OF THE INVENTION

This invention relates generally to motion picture systems and more particularly to a motion picture shutter method and apparatus for effectively increasing the light transmission over that of conventional shutters of equal size, or, conversely, providing a shutter with a given light transmission in a specified film format with a much smaller diameter than conventionally required for the same light transmission.

BACKGROUND OF THE INVENTION

The shutter of a motion picture camera or projector must keep the film covered during the time when it is moving between exposures. Since it takes a given time for a continuous rotation shutter to move across a film aperture in order to cover it, and also an equal period to uncover it, these two periods must be added to the first. Only one half of the effective illumination is lost during the time of covering and uncovering, since light transmitted in the aggregate is equivalent to one period of the shutter moving across the aperture. Therefore, to have a shutter coverage during a given intermittent film transport period, for instance, 180° as in a typical camera, the opaque sector or shutter blade covering angle must be 180° plus the angle subtended by the aperture to result in an effective exposure of 180° less the aperture covering angle.

There are a number of double shutter devices known in the art with multiple opaque sections for motion picture apparatus for the purpose of increasing light transmission. These double shutters are typically of the counter-rotating type such as shown in U.S. Pat. Nos. 2,229,237 to Brenkart and 909,627 to Roebuck. Also, there are known shutters with like rotation but with optical inversion of one to give the same effect as counter-rotation such as shown in U.S. Pat. No. 2,660,917 to Borberg.

All the foregoing counter-rotating shutters cover the light aperture more quickly with attendant gain in light transmission. However, since they cover the image edges first and the center last, then uncover the center first and the edges last, they create a very objectionable higher brightness area across the picture center.

In U.S. Pat. No. 2,260,213 to Erwin polarized shutter blades are used to obscure and uncover the aperture gradually. The object is to reduced the circular higher brightness in the aperture center, sometimes caused by illumination systems. Erwin's arrangement reduces the high brightness effect, but there is still uneven illunination distribution over the aperture as well as some brightness loss.

Finally, U.S. Pat. 2,305,201 to Sloan shows a pair of counter-rotating shutters, one with two blades of 60° and one with four blades of 30° rotating at half the speed for the purpose of improved light transmission. The effect is the same as that of the other discussed counter-rotating shutters: the time to cover the aperture is reduced at the expense of creating the undesirable higher brightness area across the aperture center. In addition, Sloan restricts the available aperture covering angle which requires a larger shutter diameter.

BRIEF DESCRIPTION OF THE PRESENT INVENTION

The present invention accomplishes the same effect of fast covering and uncovering the aperture with attendant increase of light transmission while it completely avoids the higher central brightness effect of the above mentioned other devices.

More particularly, for a given shutter size, the effective illumination period in accord with the present invention is increased by one half that of the angle subtended by the aperture. This value becomes significant if the shutter diameter is small relative to the aperture size, since the subtended angle becomes larger.

In accord with the method of this invention, there is provided a first shutter rotatably mounted with opaque and transparent sectors alternately passing in front of the aperture. A second shutter is provided coaxially rotatably mounted with the first shutter defining an opaque sector whose angle is at least equal to the angle subtended by the aperture but less than the opaque sector of the first shutter. The second shutter is rotated at twice the speed of the first shutter. The relative positions of the shutters are such that their leading edges are in alignment when starting to eclipse the aperture. As a result, the light transmission is increased because of covering and uncovering the aperture at twice the speed as would occur were only a single shutter providing the same film transport period used alone.

BRIEF DESCRIPTION OF THE DRAWINGS

A better understanding of this invention will now be had by referring to the accompanying drawings in which.

DETAILED DESCRIPTION OF THE INVENTION

Figure 1:
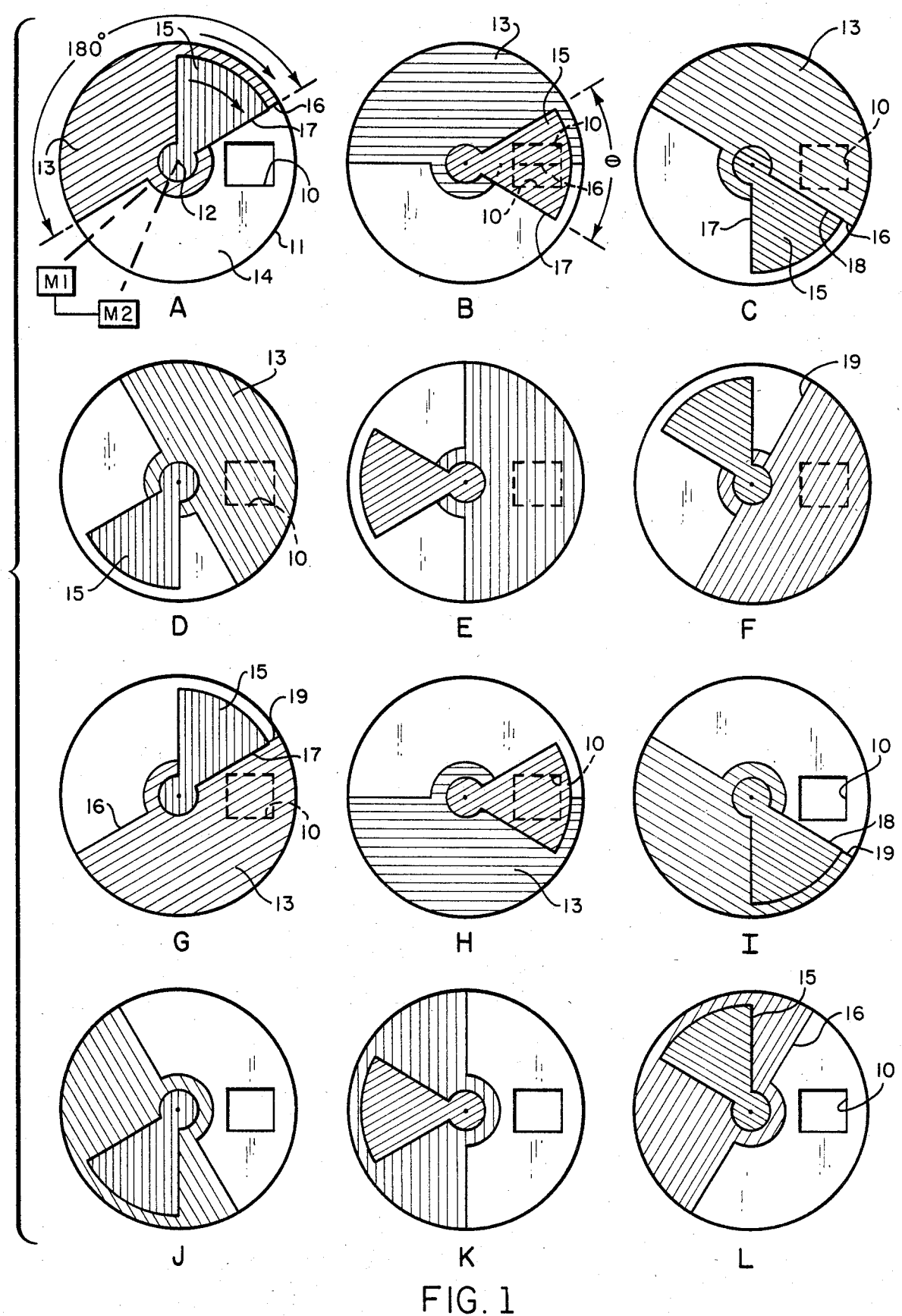
FIG. 1 is a schematic illustration of twelve successive positions of the shutters of the present invention useful in explaining their operation.

Referring first to FIG. 1, there is illustrated an aperture 10. In front of this aperture there is provided a first shutter 11 mounted for rotation about an axis 12 normal to the plane of the drawing. The first shutter 11 has an opaque sector 13 which, in the example shown, extends 180°. This extent is less than that of a single shutter normally used in a motion picture camera. The remaining transparent sector is shown at 14, the opaque sector 13 and transparent sector 14 alternately passing in front of the aperture 10.

In accord with the present invention, there is provided a second shutter having an opaque sector 15 coaxially mounted for rotation about the axis 12 in front of the first shutter 11. The opaque sector 15 of the second shutter has an angle at least equal to the angle subtended by the aperture 10 but less than the opaque sector of the first shutter. This subtended angle is indicated at $\theta$ in FIG. 1B.

Referring back to FIG. 1A the second opaque shutter sector 15 is rotated at twice the speed of the first shutter opaque sector 13. Schematically indicated is a motor Ml for rotating the first shutter and a second motor which may simply be a 2:1 ratio gear M2 for rotating the second shutter at twice the speed.

The relative positions of the shutters are such that their leading edges 16 and 17 respectively are in alignment when starting to eclipse the aperture 10 as clearly shown in FIG. 1A. With the understanding that the second shutter opaque sector 15 is rotating at twice the speed of the first opaque sector 13, it will be noted by referring to FIG. 1B that when the second opaque sector 15 completely covers the aperture 10, one half of the aperture is being covered by the leading edge of the first sector 13.

Referring to FIG. 1C, just as the second sector 15 has its trailing edge 18 leaving the end of the aperture 10, the aperture is then completely eclipsed by the first opaque sector 13.

A complete eclipsing of the aperture is retained during subsequent moments of the first opaque sector 13 through 30° steps as clearly illustrated in FIGS. 1D, E, F, and G.

In FIG. G, it will be noted that the trailing edge 19 of the first opaque sector 13 starts to uncover the aperture 10. However, the faster second opaque sector 15 of the second shutter has simultaneously at its leading edge reached the aperture to retain the aperture covered. The aperture is still thus covered as shown at H even though one half of the aperture would have been exposed by the first opaque sector 13 were the second shutter absent.

In FIG. I, the aperture 10 has now been completely uncovered. In subsequent positions illustrated at J, K and L the aperture remains completely uncovered during which time light passes therethrough. From L, the next 30° rotation of the first shutter and the simultaneous 60° rotation of the second shutter bring their respective leading edges 16 and 17 into alignment to the positions illustrated in FIG. 1A and the process repeats.

It will be understood from the foregoing that by using the second shutter rotating at twice the speed, the aperture has effectively been covered and uncovered at twice the speed that it would take to cover and uncover the same were only a single shutter opaque sector having an angular extent sufficint to cover the same film transport period used. In this respect, it should also be appreciated that in order to provide a complete eclipsing of the aperture for at least 180°, the arcuate extent of the first opaque sector 13 would have to be increased by the angle θ subtended by the aperture; that is, by 60° in this example, making the opaque secor 240° instead of 180°.

By examining the 12 positions of the shutters of FIG. 1, it will be seen that five of these 12 positions permit complete transmission, these five open positions being indicated by the diagrams A, I, J, K, and L. This provides a transmission over 150°. On the other hand, the completely eclipsed positons during the film transport period as shown are seven of the 12 designated B, C, D, E, F, G, and H. This corresponds to 210°. As mentioned heretofore, in the absence of the double fast shutter, complete eclipsing would require 240° of a single shutter and transmission would only then be 120°. The transmission has thus been increased by 30° or one half the angle subtended by the aperture by utilizing the double speed shutter.

As a consequence of the foregoing, should it be required to increase the angular period of the film transport time, it is only necessary to increase the angle of the second shutter. An example of the foregoing is indicated in FIG. 2 where the angle of the second shutter has been made equal to twice the angle θ subtended by the aperture 10.

Figure 2:
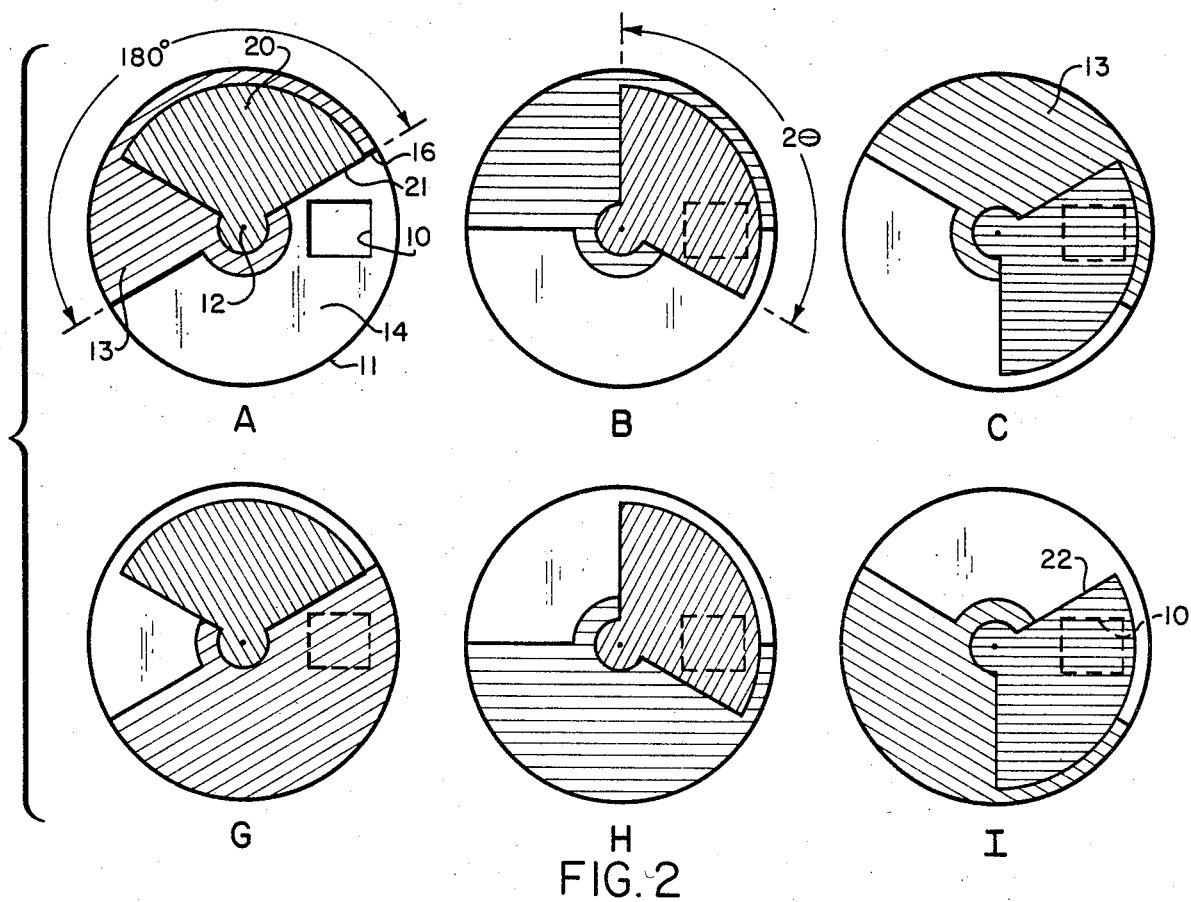
FIG. 2 is a diagrammatic view of a modified embodiment of the invention showing six positions which involve retaining the aperture covered for a longer time to increase the time available for the intermittent film transport period; and, FIG. 3 is another series of schematic illustrations of a shutter arrangement in accord with the presente invention utilized in a motion picture projector.

With specific reference to FIG. 2, and following through the sequence of positions, in the initial covering, shown in diagrams A, B and C it will be noted that the same action occurs as described with respect to diagrams A, B, and C of FIG. 1. In the FIG. 2 showing the second shutter is designated 20, since it has twice the opaque sector angle and its leading edge is shown at 21 in alignment with the leading edge 16 of the first shutter opaque sector 13 in diagram A. It will be noted in diagram C that because of the increased angle of the second shutter, it is still eclipsing the aperture but this is of no consequence, since the first shutter 13 also is eclipsing the aperture. However, during the uncovering operation as depicted by diagrams G, H and I, it will be noted that because of the increased angle of the second shutter, the aperture 10 is still covered in diagram I whereas in the normal situation described in FIG. 1, the aperture is uncovered in diagram I. Thus, there is provided an additional total eclipsing of the aperture by the increased angle second shutter to thereby increase the time available for the intermittent film transport.

As a basic principle, in the camera where the single main shutter covers 180°, the single second faster shutter opaque section covers the angle subtended by the aperture, plus twice the angle to be added to the film transport period beyond that of the original angle of the first shutter. That is, beyond 180°.

The shutter described thus far as mentioned heretofore is for use with a camera shutter of 180°. That is, 180° of complete shutter eclipsing is desired during the intermittent film transport period. This complete eclipsing has been accomplished by the use of the faster second shutter rather than increase the opaque sector of the first shutter beyond 180° which would lessen the light transmission all as described.

The same principle applies equally well for motion picture projectors. The requirements of a motion picture projector differs from that of a camera as follows:

The film motion period in a projector is typically only 90° or one quarter of the full cycle. In addition, it is well known that a typical projector with 24 frames per second speed requires a second shutter plane of equal period or angle to eliminate the sensation of flicker. Since the period of retention in the average human eye is about 1/45th of a second, 24 shutter interruptions per second are quite noticeable and lead to the described unpleasant sensation of flicker. However, if the number of light interruptions per second is doubled, the periods of 1/48th seconds are too short for most observers to notice and flicker is avoided. This action, on the other hand, causes a substantial loss of light transmission or intensity which is of special importance in projection equipment. Therefore there is a need for greater shutter efficiency in accord with the present invention.

Figure 3:
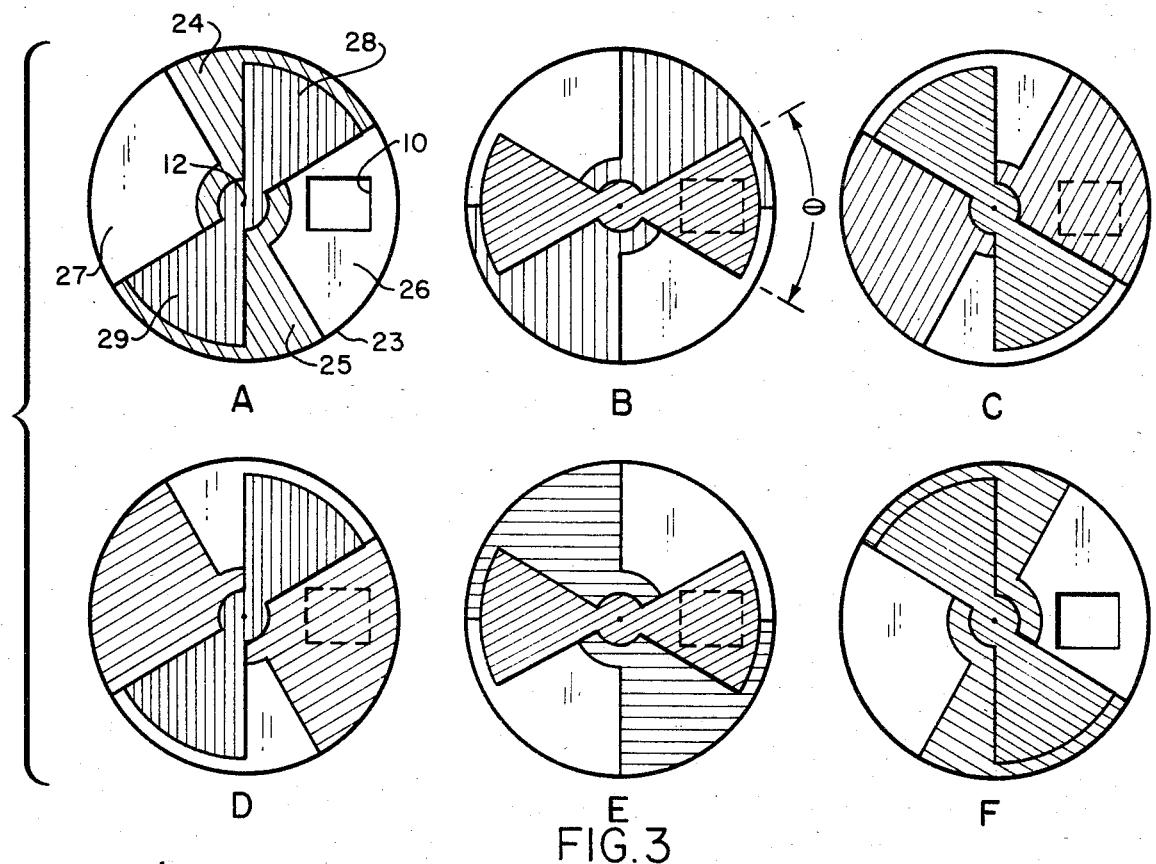

Such a shutter configuration is described for a projector with 90° film motion period or pull down in FIG. 3. In FIG. 3, the same aperture 10 has been chosen as used in the description of the camera in FIG. 1.

As shown in FIG. 3, there is provided a first shutter 23 mounted for rotation about the axis 12 and having two opaque sectors 24 and 25 of 90° each spaced diametrically opposite each other to leave two transparent 90° sectors therebetween. The sectors alternately pass in front of the aperture 10. A second shutter rotating at twice the speed of the first shutter, in turn, has two opaque sectors 28 and 29 again each of an angle corresponding to that subtended by the aperture 10 diametrically arranged as shown.

As in the case of the camera of FIG. 1, the relative positions of the two shutters are such that the leading edges of the opaque sections for the first and second shutters 24 and 28 are in alignment at the start of the eclipsing of the aperture 10.

Following through the diagrams A, B, and C the eclipsing of the aperture is effected at twice the speed as would take place in the absence of the second opaque sector 28 as described in FIG. 1.

FIGS. D, E and F show uncovering of the shutter and correspond to the uncovering of the camera shutter of FIG. 1 shown in diagrams G, H and I of FIG. 1. Again, it will be appreciated that the covering and uncovering operations take place at twice the speed as would be the case if a single shutter with two sectors were used so that the light transmission is again increased.

It should also be realized that the film transport period for the projector can be increased by increasing the angular extent of the second shutter beyond the angle subtended by the aperture. As in the case of the camera, the general principle involved can be stated as follows: the slow first shutter blades must always cover 90° in the projector application. The blades of the second faster shutter must cover the angle subtended by the aperture plus twice the angle that is to be added to the film transport motion period beyond the original angle of the first opaque blade or shutter; that is, beyond 90°.

It can also be appreciated that in accord with the present invention for a given light transmission the rotating shutters can be made of smaller diameters. In other words, to provide for a light transmission equivalent to that realized by the present invention, a single shutter would have to be made of larger diameter so that the angle subtended by the aperture is effectively smaller and the given rate of rotation of the shutter covers and uncovers the aperture faster. In other words, the greater the diameter of the shutter for a fixed aperture size, the faster will be the covering and uncovering of the aperture. However, by utilizing the second faster shutter as in the case of the present invention, the shutter diameters may not be so large in order to increase the light transmission.

All the foregoing is accomplished without any affecting of the light distribution across the aperture which remains uniform.

From all of the foregoing, it will now be evident that the present invention has provided a greatly improved method and apparatus for increasing light transmission of a camera or projector by utilizing a unique shutter arrangement or, conversely, providing a given light transmission in a specified film format or given aperture in a much smaller diameter shutter arrangement.

Changes falling within the scope and spirit of the present invention will occur to those skilled in the art. The motion picture shutter method and apparatus is therefore not to be thought of as limited specifically to the particular embodiments disclosed.

I claim:

1. A method for controlling light transmission through an aperture in a motion picture apparatus, including the steps of:
   (a) providing a first shutter rotatably mounted with opaque and transparent sectors alternately passing in front of said aperture;
   (b) providing a second shutter coaxially rotatably mounted with said first shutter defining an opaque sector whose angle is at least equal to the angle subtended by said aperture but less than that of the opaque sector of said first shutter; and
   (c) rotating said second shutter at twice the speed of said first shutter, the relative positions of said shutters being such that the leading edges of their opaque sectors are in alignment when starting to eclipse said aperture whereby said aperture is covered and uncovered at twice the speed as would occur by use of only a single shutter having an opaque sector whose angle is at least equal to the sum of the angles of the opaque sectors of the first shutter and the second shutter.

2. The method of claim 1, in which the total angular period said aperture is completely eclipsed can be increased by increasing the angle of said opaque sector of said second shutter, said increase being equal to twice the angle of be added to the angular period during which said aperture is completely eclipsed.

3. The method of claim 1, in which said motion picture apparatus is a camera and said first shutter has a single opaque sector of 180°.

4. The method of claim 1, in which said motion picture apparatus is a projector and first shutter has two opaque sectors of 90° each spaced diametrically opposite each other to leave two transparent 90° sectors therebetween, and in which said second shutter has two opaque sections each of an angle equal to the angle subtended by said aperture, spaced diametrically opposite each other.

5. The method of claim 1, in which said step of providing the first shutter comprises providing the opaque sector thereof to have an angle at least equal to the degrees of rotation of the first shutter during a film transport time period for the motion picture apparatus.

6. An apparatus for controlling light transmission through an aperture in a motion picture apparatus including, in combination:
   (a) a first shutter rotatably mounted with opaque and transparent sectors alternately passing in front of said aperture;
   (b) a second shutter coaxially rotatably mounted with said first shutter defining an opaque sector whose angle is at least equal to the angle subtended by said aperture but less than the angle of the opaque sector of said first shutter; and
   (c) means for rotating said second shutter at twice the speed of said first shutter, the relative positions of said shutters being such that the leading edges of their opaque sectors are aligned when starting to eclipse said aperture, whereby said aperture is covered and uncovered at twice the speed as would occur by use of only a single shutter having an opaque sector whose angle is at least equal to the sum of the angles of the opaque sectors of said first shutter and said second shutter.

7. An apparatus according to claim 6, in which the total angular period said aperture is completely eclipsed is increased by increasing the angle of said opaque sector of said second shutter, said increase being equal to twice the angle to be added to the angular period during which said aperture is completely eclipsed.

8. An apparatus according to claim 6, in which said motion picture apparatus is a camera and said first shutter has a single opaque sector of 180°.

9. An apparatus according to claim 6, in which said motion picture apparatus is a projector and said first shutter has two opaque sectors of 90° each, spaced diametrically opposite each other to leave two transparent 90° sectors therebetween, and in which said second shutter has two opaque sectors, each having an angle at least equal to the angle subtended by said aperture, and being diametrically spaced.

10. An apparatus according to claim 6, in which said opaque sector of said first shutter has an angle at least equal to the degrees of rotation of said first shutter during a film transport time period for the motion picture apparatus.

11. An apparatus according to claim 6, in which the motion picture apparatus is a projector and said first shutter has two diametrically opposite opaque sectors, and wherein said second shutter has two diametrically opposite opaque sectors each having an angle at least equal to the angle subtended by said aperture.

12. The method of claim 11, in which the motion picture apparatus is a projector and the first shutter has two diametrically opposite opaque sectors, and wherein the second shutter has two diametrically opposite opaque sectors each having an angle at least equal to the angle subtended by the aperture.

* * * * *